(12) United States Patent
Hosomizo

(10) Patent No.: US 11,726,729 B2
(45) Date of Patent: Aug. 15, 2023

(54) PRINTING SYSTEM INCLUDING INFORMATION PROCESSING DEVICE AND PRINTER HAVING RESTRICTION FUNCTION OF PRINTING, AND NON-TRANSITORY COMPUTER-READABLE RECORDING MEDIUM CONTAINING COMPUTER-EXECUTABLE INSTRUCTIONS THEREFOR

(71) Applicant: BROTHER KOGYO KABUSHIKI KAISHA, Nagoya (JP)

(72) Inventor: Yoshito Hosomizo, Kitanagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 17/574,710

(22) Filed: Jan. 13, 2022

(65) Prior Publication Data

US 2022/0229612 A1    Jul. 21, 2022

(30) Foreign Application Priority Data

Jan. 15, 2021   (JP) .................. 2021-004721

(51) Int. Cl.
  *G06F 3/12* (2006.01)
  *H04N 1/44* (2006.01)

(52) U.S. Cl.
  CPC .......... *G06F 3/1238* (2013.01); *G06F 3/1204* (2013.01); *G06F 3/1222* (2013.01); *H04N 1/4413* (2013.01); *H04N 1/4433* (2013.01)

(58) Field of Classification Search
  None
  See application file for complete search history.

(56) References Cited

U.S. PATENT DOCUMENTS

| 2009/0122347 A1 | 5/2009 | Utsubo et al. |
| 2015/0381842 A1* | 12/2015 | Mori ...................... G06F 3/1288 358/1.14 |

(Continued)

FOREIGN PATENT DOCUMENTS

| JP | 2009-122857 A | 6/2009 |
| JP | 2009170996 A * | 7/2009 ......... G03G 15/5075 |

(Continued)

OTHER PUBLICATIONS

English translation of JP-2009170996-A. (Year: 2009).*

(Continued)

*Primary Examiner* — Thomas D Lee
(74) *Attorney, Agent, or Firm* — Scully, Scott, Murphy & Presser, PC

(57) ABSTRACT

When a print instruction making a printer to print an image is received from an application program implemented in an information processing device for a general-use printing program embedded in the information processing device, a supporting program causes the information processing device to obtain identification information which identifies a user, and transmit a print job associated with the identification information to the printer. The printer determines whether printing in accordance with the print job is to be performed based on a usage condition of the user identified by the identification information associated with the print job.

8 Claims, 9 Drawing Sheets

(56) References Cited

U.S. PATENT DOCUMENTS

| | | | |
|---|---|---|---|
| 2016/0246551 A1* | 8/2016 | Ichikawa | ............ G06F 9/4411 |
| 2020/0174724 A1 | 6/2020 | Yamada | |
| 2020/0314287 A1 | 10/2020 | Kawamura et al. | |

FOREIGN PATENT DOCUMENTS

| | | | | |
|---|---|---|---|---|
| JP | 2013-201573 A | | 10/2013 | |
| JP | 2018-199333 A | | 12/2018 | |
| JP | 2019004513 A | * | 1/2019 | ......... G06F 21/608 |
| JP | 2020-166676 A | | 10/2020 | |
| NO | 2020/110991 A1 | | 6/2020 | |

OTHER PUBLICATIONS

English translation of JP-2019004513-A. (Year: 2019).*
International Search Report and Written Opinion dated Mar. 15, 2022 from related PCT/JP2022/001006 together with English translations.

* cited by examiner

| USER NAME | USER ID | USAGE CONDITION | | |
|---|---|---|---|---|
| | | THE NUMBER OF PAGES TO BE PRINTED | COLOR/MONOCHROMATIC | TONER SAVE |
| A | 1001 | 50 | MONOCHROMATIC | ON |
| B | 1002 | 100 | COLOR/MONOCHROMATIC | ON |
| C | 1003 | 80 | MONOCHROMATIC | ON·OFF |
| D | 1004 | UNLIMITED | COLOR/MONOCHROMATIC | ON·OFF |

FIG. 2

PRINTING SYSTEM INCLUDING INFORMATION PROCESSING DEVICE AND PRINTER HAVING RESTRICTION FUNCTION OF PRINTING, AND NON-TRANSITORY COMPUTER-READABLE RECORDING MEDIUM CONTAINING COMPUTER-EXECUTABLE INSTRUCTIONS THEREFOR

CROSS-REFERENCE TO RELATED APPLICATIONS

This application claims priority under 35 U.S.C. § 119 from Japanese Patent Application No. 2021-004721 filed on Jan. 15, 2021. The entire subject matter of the application is incorporated herein by reference.

BACKGROUND

The present disclosures relate to printing systems configured to support control of printers, and a non-transitory computer-readable recording medium containing computer-executable instructions to support the control of printers.

There has been conventionally known a technology to manage availability of printer functions for each user. There has also been known a technology to control a printer from an information processing device where the use of some functions is restricted.

SUMMARY

In recent years, a technology to control a printer by means of a standard printing program embedded in an OS (operating system) of a PC (personal computer) without using a printer driver has been put into practical use. In this technology, the OS associates the printer with the standard OS printing program, and thereafter, when print instructions for the printer are received, printing according to the standard OS printing program can be performed without using a printer driver.

There is a printer which is configured to manage whether or not a print job received from an information processing device can be executed by the printer. For example, when the information processing device transmits a print job which is associated with user's identification information attached thereto by the printer driver, the printer can determine whether the received print job can be executed based on the associated identification information. According to the conventional art described above, the printer can determine whether to execute the print job based on the identification information associated with the received print job. However, the aforementioned OS-standard general-use printing program does not provide a means to associate the user's identification information with the print job. Therefore, it would be difficult to manage the availability of the printers according to the respective users.

According to aspects of the present disclosures, there is provided a non-transitory computer-readable recording medium for an information processing device having a computer. The information processing device is connectable to a printer having a restriction function of determining enablement or disablement of printing based on a usage condition set by a user. The computer-readable recording medium containing computer-executable instructions realizes a supporting program corresponding to the printer. When a print instruction making the printer to print an image is received from an application program implemented in the information processing device for a general-use printing program embedded in an operating system of the information processing device, the computer-executable instructions can cause, when executed by the computer, the information processing device to perform obtaining identification information which identifies a user, and transmitting a print job corresponding to the print instruction to the printer, the print job being associated with the identification information. The printer is configured to determine whether printing in accordance with the print job is to be performed based on the usage condition of the user identified by the identification information associated with the print job.

BRIEF DESCRIPTION OF THE DRAWINGS

FIG. 2 schematically shows an example of a data structure of a usage condition database.

DETAILED DESCRIPTION OF THE EMBODIMENTS

Hereinafter, referring to the accompanying drawings, a personal computer (hereinafter referred to as a "PC") using a supporting program according to the present disclosures will be described in detail. The present specification discloses a printing system including a printer and a PC in which a supporting program corresponding to the printer is installed.

First Embodiment

Figure 1:
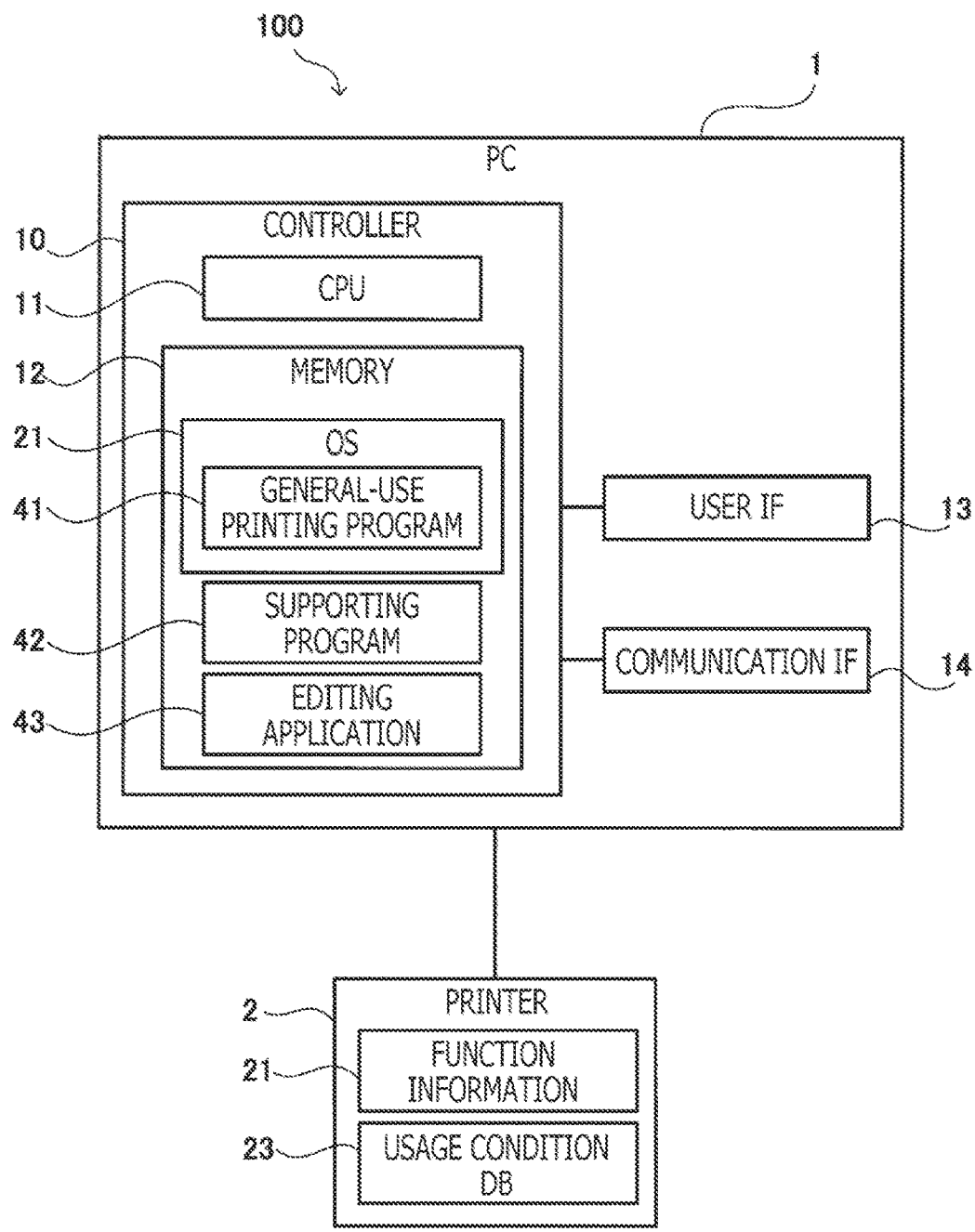
FIG. 1 is a block diagram of a printing system according to a first embodiment.

A printing system 100 according to a first embodiment is configured such that, as shown in FIG. 1, a PC 1 is communicatively connected to a printer 2. The PC 1 has a controller 10 including a CPU 11 and a memory 12. The PC 1 is an example of an information processing device. The CPU 11 is an example of a computer. The PC 1 also includes a user interface (hereinafter referred to as a "user IF") 13 and a communication interface (hereinafter referred to as a "communication IF") 14, which are electrically connected to the controller 10. It is noted that the "controller" 10 indicated in FIG. 1 is a generic term for hardware and software used to control the PC 1, and does not necessarily represent a single piece of hardware that actually existing in the PC1.

The CPU 11 executes various processes in accordance with programs read from the memory 12 and/or based on user operations. Various programs, including various application programs (hereinafter simply referred to as "applications"), and various data are stored in the memory 12. The memory 12 is also used as a work area when various processes are executed. It is noted that a buffer provided in the CPU 11 is also an example of memory. The example of the memory 12 is not limited to a ROM, a RAM, an HDD, and the like included in the PC 1, but can also be a storage medium such as a CD-ROM, a DVD-ROM, and the like that is readable and writable by the CPU 11.

The user IF 13 includes hardware for displaying a screen for informing the user of information and hardware for receiving operations by the user. The user IF 13 may be a combination of a display configured to display information and a mouse, keyboard, and the like having an input receiving function, or a touchscreen panel having both a display function and an input receiving function.

The communication IF 14 includes hardware for communicating with external devices such as the printer 2. A communication standard of the communication IF 14 is Ethernet (registered trademark), Wi-Fi (registered trademark), USB, and the like. The PC 1 may include multiple communication IFs 14 respectively corresponding to multiple communication standards.

The memory 12 of the PC 1 stores an operating system (hereinafter referred to as an "OS") 21 including a general-use printing program 41, a supporting program 42, and an editing application 43, as shown in FIG. 1. The supporting program 42 is an example of a supporting program. The editing application 43 is an example of an application program. The OS 21 is, for example, Windows (registered trademark), macOS (registered trademark), Linux (registered trademark), iOS (registered trademark), or Android (registered trademark).

The general-use printing program 41 is an OS-standard program for executing printing on various printers, such as the printer 2, based on the user's instructions.

The general-use printing program 41 supports functions that can be commonly used by multiple models of printers provided by various printer vendors. The general-use printing program 41, however, does not support all of the functions that are inherent to the multiple models of printers, and functions the general-use printing program 41 supports are limited to generic ones.

The supporting program 42 is a program or group of programs that accompanies the processing of the general-use printing program 41 and executes processing based on instructions from the OS 21, and is an application that supports the control of a target hardware. The supporting program 42 in the present embodiment corresponds to the model of the printer 2 connected to the PC 1. For example, the supporting program 42 is launched by the general-use printing program 41 when the instructions to execute printing on the printer 2 are received using the general-use printing program 41. The supporting program 42 is called, for example, a hardware support application (abbreviated as HSA).

The supporting program 42 is capable of receiving multiple types of instructions from the general-use printing program 41 and executes various processes based on the received instructions. In addition, the supporting program 42 obtains a user ID that identifies the user and transmits the obtained user ID to the printer 2 in correspondence with the print job when processing to have the printer 2 print in response to receiving a print execution instruction to print from the general-use printing program 41. The supporting program 42 may be a combination of multiple programs each receiving an execution instruction, or a single program that can execute different processes depending on execution instructions.

The supporting program may be a program prepared for each type of a printer by the vendors of the printer. For example, a supporting program for an inkjet printer and another supporting program for a laser printer may be prepared. When, for example, a new printer is connected to the PC 1, the OS 21 of the PC 1 downloads an appropriate supporting program from a server or the like according to the type of the connected printer, and incorporates the downloaded supporting program into the device. Then, the OS 21 stores the identification information of the embedded supporting program in the memory 12, with associating the identification information of the embedded supporting program with the printer information of the newly connected printer. It is noted that the supporting program may not necessarily be prepared for each printer type, but may be prepared for each of the printer models or series of printer models.

The editing application 43 is, for example, an application for generating and editing image data and document data. The editing application 43 may be, for example, Word or PowerPoint provided by Microsoft (registered trademark), or an application provided by a vendor of the printer 2. The editing application 43 is configured to receive user operations including instructions to cause the printer 2 to perform a particular operation. Concretely, the editing application 43 is configured to, for example, receive, via the user IF 13, a print execution instruction to cause the printer 2 to perform printing.

The printer 2 in the present embodiment is a device having a printing function. The PC 1 can communicate with the printer 2 via the communication IF 14. The printer 2 is configured to receive print data, for example, from the PC 1 or other devices and execute printing based on the received print data. Further, the printer 2 according to the present embodiment has a restriction function of determining whether printing can be performed based on a usage condition set for each user. The restriction function can be enabled or disabled through the management device 3 or through the operation panel of the printer 2. The memory of the printer 2 stores function information 21 that indicates the enablement or disablement of the restriction function. The function information 21 may include information on the enablement and disablement of other functions, such as the scanning function, the facsimile transmission function, and the like. The printer 2 according to the present disclosures is also provided with a usage condition DB 23 storing usage conditions set to respective users.

FIG. 2 shows an example of a data structure of the usage condition DB 23. The usage condition DB 23 stores the usage condition each associated with a user name, which indicates a name of the user, and a user ID, which identifies the user. The user ID is an example of identification information.

The usage condition is a condition that determine whether printing can be executed on the printer 2. The usage condition in the present embodiment restricts the use of specific print settings. The specific print settings are, for example, print settings that contribute to saving consumables such as toner, paper or the like.

The usage condition includes, for example, a condition on the number of prints, a condition on color/monochrome, and a condition on toner saving. The condition on the number of prints defines an upper limit of the number of sheets that a user can print in one print job. The "number of prints" condition may be set to "unlimited" to indicate that the number of prints is not limited. The number of prints may be the number of times of printing which is counted for each print job. The number of prints may be the total number of sheets of paper that can be printed within a given period of time, or the total number of times the print job can be executed. The condition on "color/monochrome" indicates whether color printing is restricted or not. In other words, when the use of color printing is restricted and only the use of monochrome printing is permitted, only "monochrome"

is set in the "color/monochrome" setting. The condition on toner saving indicates whether or not printing is restricted that toner saving has not been set. In other words, when printing that the toner saving is not set is restricted and printing that the toner saving is set is allowed, "on" is set as the "toner saving" condition, and when printing that toner saving is not set is allowed, "on" and "off" are set as the "toner saving" condition.

Further, the usage condition may include a condition on single-sided/double-sided, a condition on aggregate printing (e.g., 2-in-1), and a condition on printing of specific paper types. The "single-sided/double-sided" condition indicates whether or not single-sided printing is restricted. The "aggregate printing" condition indicates whether printing without aggregation set is restricted or not. The "print on specific paper type" condition indicates whether printing on a sheet of a specific paper type, such as postcards, is restricted or not.

In the present embodiment, a target user of the identification information is regarded as an individual, but a group or a company (corporation) may be regarded as the target user of the identification information. In the latter case, the usage condition is associated with group identification information that identifies a group as the user and company identification information that identifies a company (corporation) as the user and are stored in the usage condition DB 23.

Figure 3:
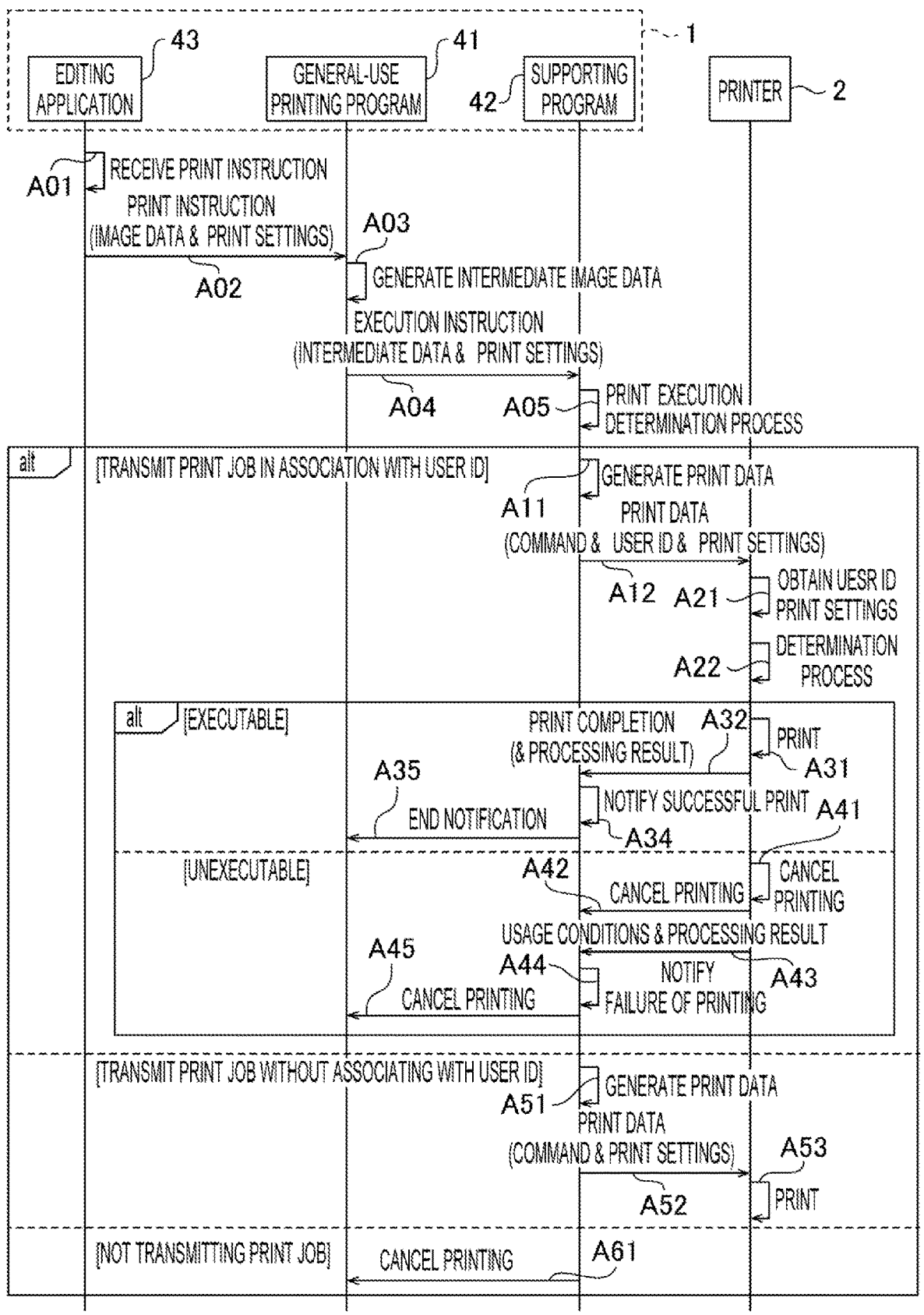
FIG. 3 is an example of a sequence chart illustrating a procedure of a printing operation by respective programs.

Next, a procedure of printing including an operation of the supporting program 42 according to the present embodiment will be described with reference to a sequence diagram shown in FIG. 3. FIG. 3 shows an operation when a print execution instruction to print with the printer 2 using the general-use printing program 41 is received by an application that receives the print instructions such as an editing application 43, and when the supporting program 42 corresponding to the printer 2 has been incorporated in the PC 1.

Each processing step in processes and flowcharts in the present embodiment basically indicates processing performed by the CPU 11 in accordance with instructions described in a program such as the supporting program 42, and the like. The processing by the CPU 11 also includes hardware control using an API of the OS 21. In this specification, a detailed description of OS 21 is omitted and the operation of each program is described. In addition, the term "obtain" is used in a concept that does not require a request.

As shown in FIG. 3, when the editing application 43 receives a print instruction (A01) with the printer 2 and various print settings being selected on the print screen after receiving the editing of text, graphics, and the like, the editing application 43 passes the information about the received print instruction to the OS 21. When the print instruction is received, the OS 21 executes the general-use printing program 41 and passes the image data, print settings, and other information about the print instruction to the general-use printing program 41 (A02).

The general-use printing program 41 generates intermediate image data by converting the format of the image data contained in the information about the received print instructions into the format of intermediate image data, and generates a print job including the intermediate image data (A03). The image data passed from the editing application 43 can be of various types, and the general-use printing program 41 converts the received image data into the intermediate image data suitable for generating the print data. It is noted that when the image data included in the print instruction is suitable for generating the print data, the generating of the intermediate image data may be omitted and the image data included in the print data may be used as the intermediate image data as is. The intermediate image data generated by the general-use printing program 41 is, for example, XPS data.

The general-use printing program 41 is configured to output an execution instruction to the supporting program 42 as the device selected in the print instruction is the printer 2 and the supporting program 42 corresponding to the printer 2 is stored in the memory 12 (A04). The general-use printing program 41 causes the supporting program 42 to operate by the execution instruction and passes the generated intermediate image data to the supporting program 42. It is noted that, in A04, the information on the print settings is also passed to the supporting program 42 along with the intermediate image data.

The general-use printing program 41 may cause the supporting program 42 to be executed before generating the intermediate image data. The supporting program 42 may, for example, receive information indicating the print settings included in the print instructions from the general-use printing program 41, edit some of the information, and return the same to the general-use printing program 41.

When the supporting program 42 receives an execution instruction from the general-use printing program 41 in A04, the supporting program 42 executes the transmission determination process (A05). The transmission determination process is for determining whether or not to associate a user ID with a print job to be transmitted to the printer 2.

The transmission determination process executed in A05 will be explained with reference to a flowchart shown in FIGS. 4A and 4B. This transmission determination processing is a process of the supporting program 42 and is executed by the CPU 11 of the PC 1. In the transmission determination process, the CPU 11 first obtains the function information 21 that includes information on the enablement and disablement of the restricted function (S1). It is noted that a process in S1 is an example of the management information obtain process. For example, the CPU 11 requests, via the communication IF 14, transmission of function information 21 to the printer 2 selected in the print instruction. When the CPU 11 receives, via the communication IF 14, the function information 21 output by the printer 2 in response to the request, the CPU 11 stores the function information 21 in the memory 12.

The CPU 11 determines, in S3, whether or not the function information 21 has been successfully obtained in S1. For example, a printer that does not have the restriction function does not have the function information 21. When such a printer is selected, the CPU 11 fails to obtain the function information 21 (S3: NO). In such a case, since it is assumed that the printer does not restrict usage thereof and anyone can use any function, the CPU 11 determines that the print job is to be transmitted without being associated with the user ID (S27) and returns to the process of FIG. 3.

Figure 4A:
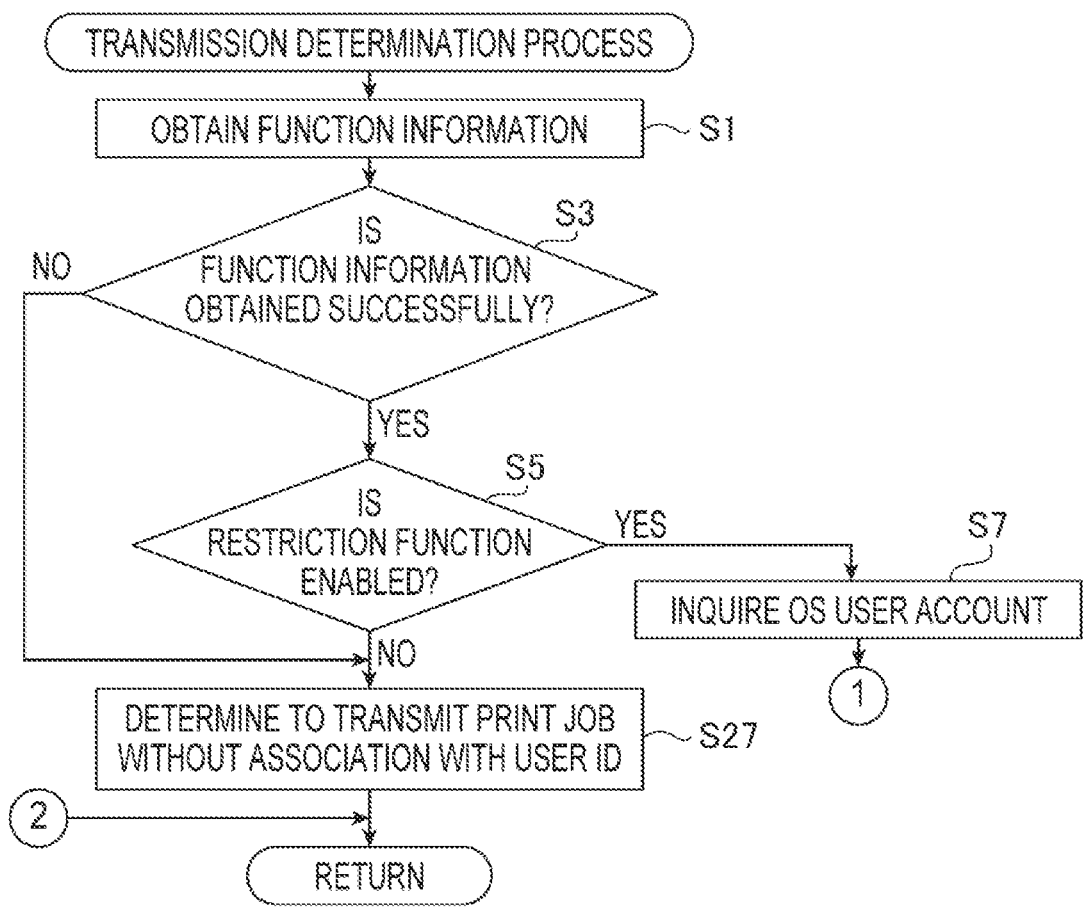
FIG. 4A and FIG. 4B are a flowchart illustrating an example of a transmission determination process.
Figure 4B:
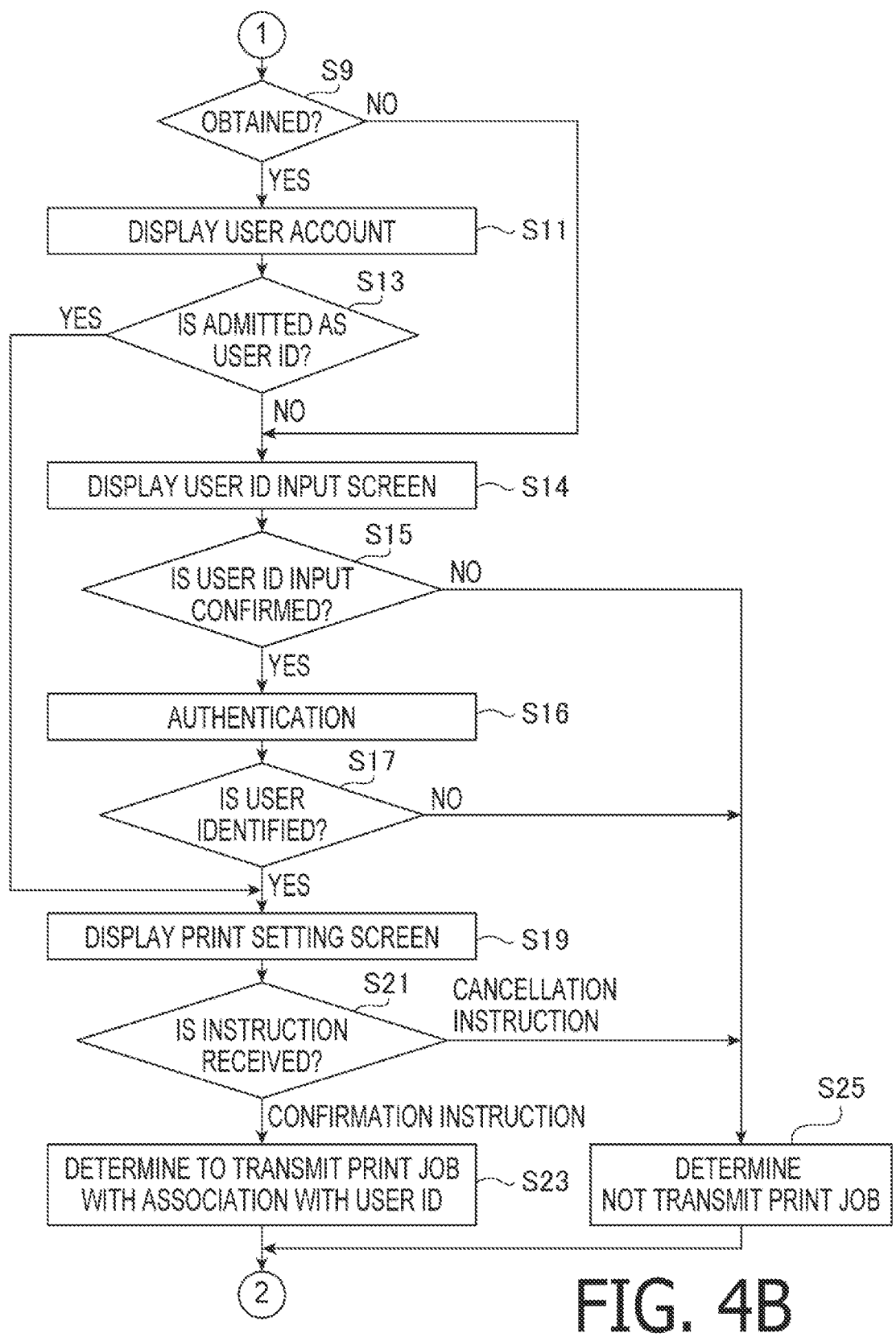

On the other hand, as shown in FIGS. 4A and 4B, when the CPU 11 has successfully obtained the function information 21 (S3: YES), the CPU 11 determines whether the information indicating the enablement or disablement of the restriction function, which is included in the function information 21 obtained in S1, indicates the enablement (S5). For example, when the function information 21 obtained from the printer 2 includes information indicating the disablement of the restriction function (S5: NO), the CPU 11 determines that the print job is to be transmitted without being associated with the user ID (S27) and returns to the process of FIG.

3, since the printer 2 does not restrict the usage thereof and there is a high possibility that the printer 2 can perform printing.

As shown in FIG. 4, when the function information 21 obtained from the printer 2 includes information indicating the enablement of the restriction function (S5: YES), the CPU 11 inquires the user account of a login user to the OS 21 (S7) and determines whether or not the user account has been obtained (S9). When the user account is obtained (S9: YES), the CPU 11 displays the obtained user account via the user IF 13 (S11) and determines whether or not to approve the user account as the user ID (S13). When the CPU 11 receives an instruction to approve via the user IF 13 input When the instruction of approval is received through the input operation to the user IF13 (S13: YES), the CPU 11 displays a print setting screen on the user IF 13 as described below (S19). It is noted that, in S11, a change of the user ID may be received, and approval may be given for the changed user ID in S13.

On the other hand, when the CPU 11 receives an instruction not to approve the obtained user account via the input operation to the user IF 13 (S13: NO), the CPU 11 displays the user ID input screen via the user IF 13 (S14).

Figure 5:
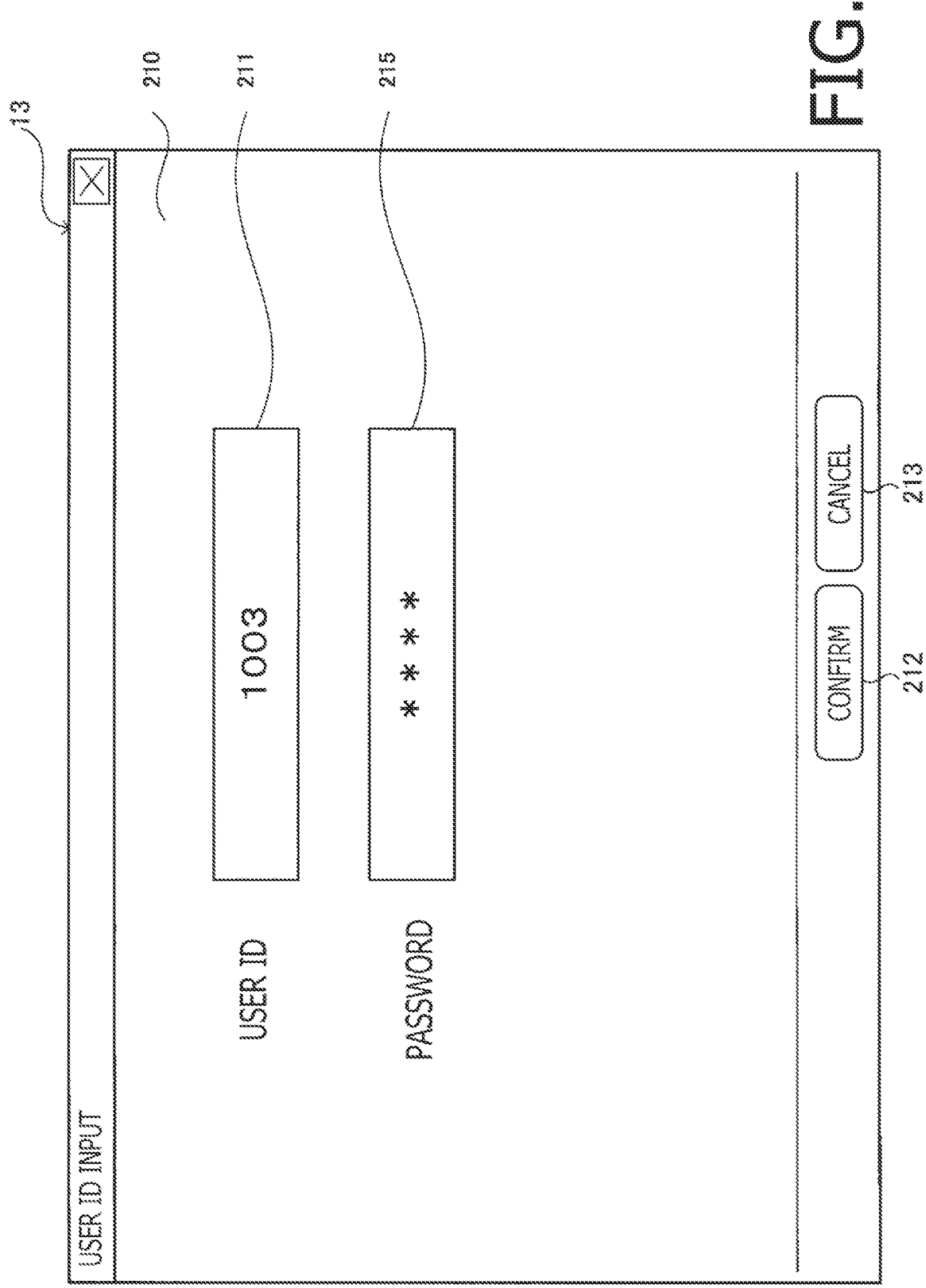
FIG. 5 is an example of a user ID input screen.

For example, as shown in FIG. 5, a user ID input screen 210 includes a first input field 211 in which the user ID is to be input and a second input field 215 in which the password is to be input, and prompts the user to input the user ID and password. The user ID input screen 210 also includes a confirm button 212 to receive the user's instruction to confirm the user ID, and a cancel button 213 to instruct cancellation of printing.

In the case where the supporting program 42 has a function to register a user ID, a selection field may be provided, instead of the first input field 211, to selectively display the user ID registered in the supporting program 42 on the user IF 13 so that the user can select the user ID. In this case, S7 to S17 of FIG. 4 can be omitted, thereby reducing the processing load of the supporting program 42.

When the user enters the user ID and the password in the first input field 211 and the second input field 215, respectively, via the user IF 13 and operates the confirm button 212, the CPU 11 determines that the input of the user ID has been confirmed (S15: YES), as shown in FIG. 4. In this case, the CPU 11 performs authentication based on the input user ID and password (S16), and determines whether or not the user has been identified (S17). The CPU 11 may have an external device, such as a printer or an authentication server, perform the authentication and determine whether or not the user has been identified by obtaining the result of the authentication.

When the authentication in S16 is successful and the user is identified (S17: YES), the CPU 11 displays the print setting screen on the user IF 13 (S19).

Figure 6:
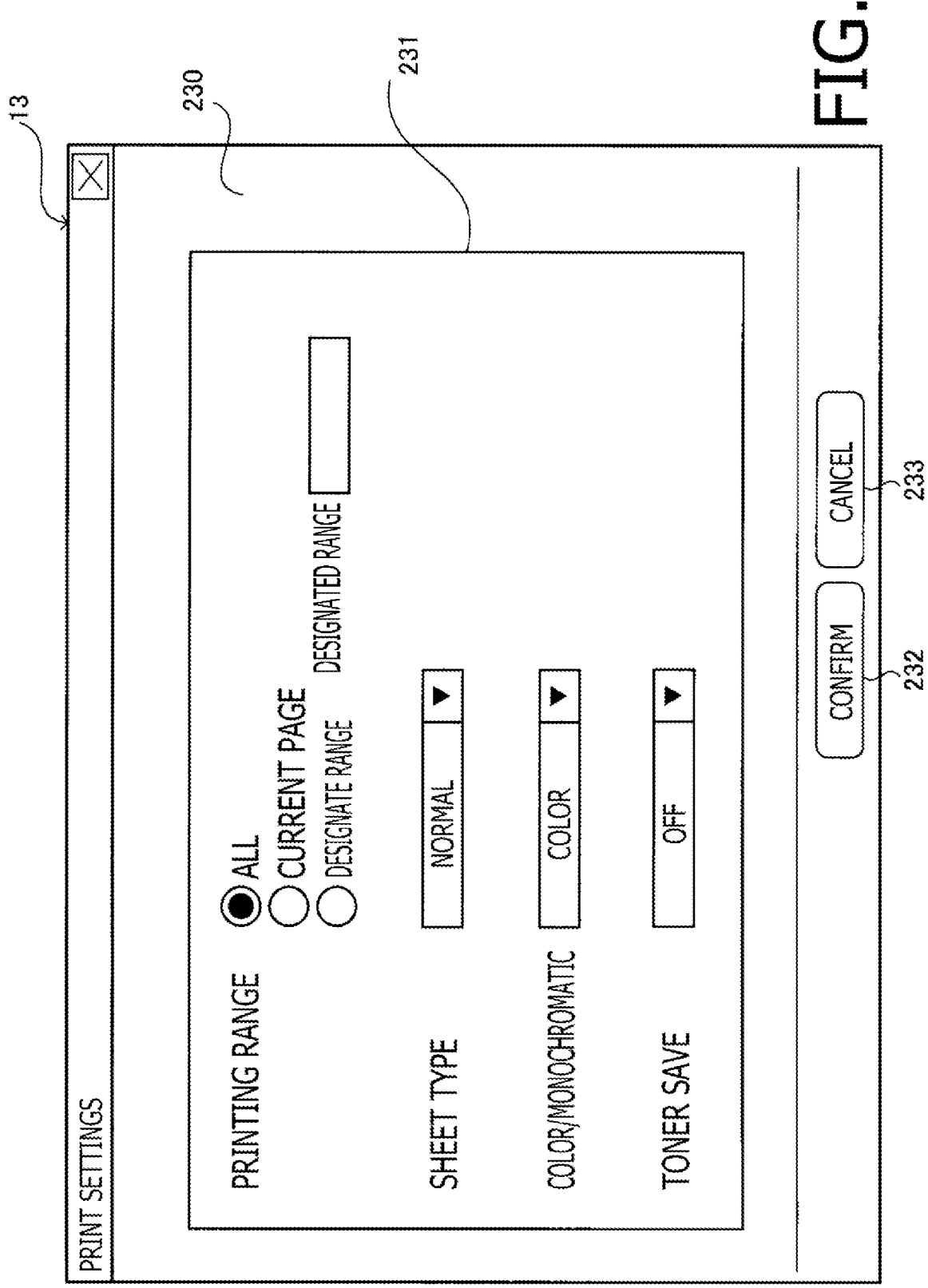
FIG. 6 is an example of a print setting screen.

For example, the print setting screen 230 shown in FIG. 6 has a setting field 231 for setting a set value for each item of the print setting, a confirm button 232 for confirming the print setting, and a cancel button 233 for canceling printing. In the setting field 231, the print settings received from the general-use printing program 41 along with the execution instructions in A04 of FIG. 3 are displayed for each item. The CPU 11 can change the setting values of each setting via the user IF 13. In addition, the print setting screen 230 can also be used to set the print settings inherent to the printer 2 that cannot be supported by the general-use printing program 41. When the confirm button 232 on the print setting screen 230 is operated via the user IF 13, the CPU 11 determines that a confirmation instruction to confirm the print settings is received (S21: confirmation instruction). In this case, the CPU 11 determines that the print job is transmitted in association with the user ID (S23), and returns to the process of FIG. 3.

When the CPU 11 fails to obtain a user account from the OS 21 (S9: NO), the CPU 11 displays the user ID input screen 210 shown in FIG. 5 on the user IF 13 (S14). In other words, the supporting program 42 does not make the user input the user ID from the beginning, but makes the user input the user ID manually via the user IF 13 when the automatic obtaining of the user ID fails. Thus, opportunity for the user to enter the user ID can be reduced. Since the process after S14 has been described above, description thereof is omitted here.

In contrast, when, for example, the user operates the cancel button 213 of the user ID input screen 210 shown in FIG. 5 via the user IF 13, the CPU 11 determines that the user ID input is not confirmed (S15: NO). In addition, when the confirm button 212 is operated with the user ID and password entered (S15: YES), but the authentication in S16 fails, the CPU 11 determines that the user cannot be identified (S17: NO). In this case, the CPU 11 determines that the print job is not to be transmitted (S25) and returns to the process of FIG. 3.

When the cancel button 233 of the print setting screen 230 is operated via the user IF 13, the CPU 11 determines that a cancel instruction is received (S21: cancel instruction). In this case also, the CPU 11 determines that the print job is not to be transmitted (S25) and returns to the process of FIG. 3.

As shown in FIG. 3, when the supporting program 42 determines that a print job is to be transmitted in association with a user ID in the transmission determination process in A05 (alt: transmit print job in association with user ID), the supporting program 42 generates print data (A11). Concretely, the supporting program 42 performs rasterization based on the intermediate image data in response to the execution instruction received from the general-use printing program 41 in A04, and generates print data representing the image to be printed. The print data is data generated by rasterizing the intermediate image data using the print settings received from the general-use printing program 41 in A04 or the print settings received via the print setting screen 230 displayed in S19 of FIG. 4B. The print data generated here is data in a format that can be used for printing by the printer 2. The print data is, for example, PDL data dedicated to the model of the printer 2.

Instead of the supporting program 42 generating the print data at A11, the general-use printing program 41 may generate the print data. In other words, the general-use printing program 41 may rasterize the intermediate image data generated in A03 to generate the print data. The supporting program 42 may receive the print data generated by the general-use printing program 41 and edit the print data based on the print settings that cannot be supported by the general-use printing program 41. When there are no print settings that cannot be supported by the general-use printing program 41, the supporting program 42 may not edit the print data.

The print data generated by the general-use printing program 41 is print data in a format that can be used for printing on various printers. The print data is, for example, PWGRaster data or PDF data. When the rasterization is performed by the general-use printing program 41, the processing by the supporting program 42 is reduced and increase of the processing is expected to be avoided, and a program size of the supporting program 42 can be reduced. It is noted that the general-use printing program 41 does not need to generate intermediate image data when the print data can be generated from the image data included in the print instruction without using the intermediate image data.

When the supporting program 42 generates the print data at A11, the supporting program 42 transmits, to the printer 2, the generated print data, a command to instruct printing, the user ID, and the print settings used to generate the print data (A12).

The transmitting of the print data to the printer 2 may be performed by the general-use printing program 41. In other words, the supporting program 42 may pass the generated print data to the general-use printing program 41 so that the print data is transmitted from the PC 1 to the printer 2 set as the destination. In this case, the general-use printing program 41 transmits the print data received from the supporting program 42 to the printer 2. In the present embodiment, both transmitting the print data to the printer 2 by the supporting program 42 and passing the print data to the general-use printing program 41 by the supporting program 42 for transmitting the print data to the printer 2 are examples of "processing for transmitting a print job regarding the print instruction to the printer."

The printer 2, which has received the print data from the PC 1, obtains the user ID and print settings which are received along with the print data (A21), and performs a determination process (A22). In A22, the printer 2 extracts the usage condition associated with the user ID obtained in A21 from the usage condition DB 23. Then, the printer 2 compares the extracted print conditions with the print settings obtained in A21 to determine whether printing based on the print job can be performed.

It is assumed, for example, that a print job is transmitted from the PC 1 to the printer 2 by user C, for whom the number of sheets to be printed is limited to 80, only monochrome is allowed for the color/monochrome setting, and the ON and OFF settings are allowed for the toner save setting, as shown in FIG. 2. It is further assumed, for example, that the user C is about to operate the confirm button 232 using the user IF 13 to perform printing of 100 pages of sheets with setting the printing area to "all," setting the color/monochrome to "color," and setting the toner save setting to "OFF" as shown in FIG. 6. In this case, the print setting, which the printer 2 has received from the PC 1, indicates that the number of pages to be printed (100 pages) exceeds the limit number of sheets to be printed (80 sheets) for the user C. Thus, the setting of the color printing do not meet the setting for which the user C is allowed to use. As above, when the print settings do not meet all the usage conditions for the user C, the printer 2 determines that the printing cannot be performed. It is assumed, for example, that user C selects the page designation for designating the print range, sets "1-50" for the designation range, sets "monochrome" for the color/monochrome setting on the print setting screen 230, and operates the confirm button 232. In this case, the print settings the printer 2 receives from the PC 1 satisfy all the usage conditions of the user C, and the printer 2 determines that the printing can be performed.

When the printer 2 determines, in the determination process of A22, that the print settings obtained in A21 satisfy all the usage conditions extracted from the usage condition DB 23 based on the user ID obtained in A21 and that printing can be executed (alt: executable), printing is executed (A31). When the printing by the printer 2 is completed, the supporting program 42 obtains information indicating that the printing is completed from the printer 2 by a polling process (A32). When the supporting program 42 notifies the successful printing as a processing result (A34), the supporting program 42 passes an end notification to the general-use printing program 41 (A35). The notification may be made via the user IF 13 or by voice or other means.

On the other hand, when it is determined, in the determination process of A22, that the print settings obtained in A21 do not meet any of the usage conditions extracted from the usage condition DB 23 based on the user ID obtained in A21, and printing on the printer 2 is not executable (alt: unexecutable), the printer 2 cancels the printing (A41). When the printing is canceled by the printer 2, the supporting program 42 information indicating that the printing is canceled from the printer 2 by the polling process (A42). When the supporting program 42 obtains the information indicating that the printing is canceled, the supporting program 42 obtains, from the printer 2, the usage conditions used in the determination process of A22 and the determination result of the determination process of A22 (A43).

When the supporting program 42 obtains the information, the supporting program 42 displays a print failure notification screen on the user IF 13 as a processing result (A44) and passes the information indicating that the printing is cancelled to the general-use printing program 41 (A45). It is noted that A32, A42-A43 represent an example of a result obtain process, and A34 and A44 are examples of notification processing.

Figure 7:
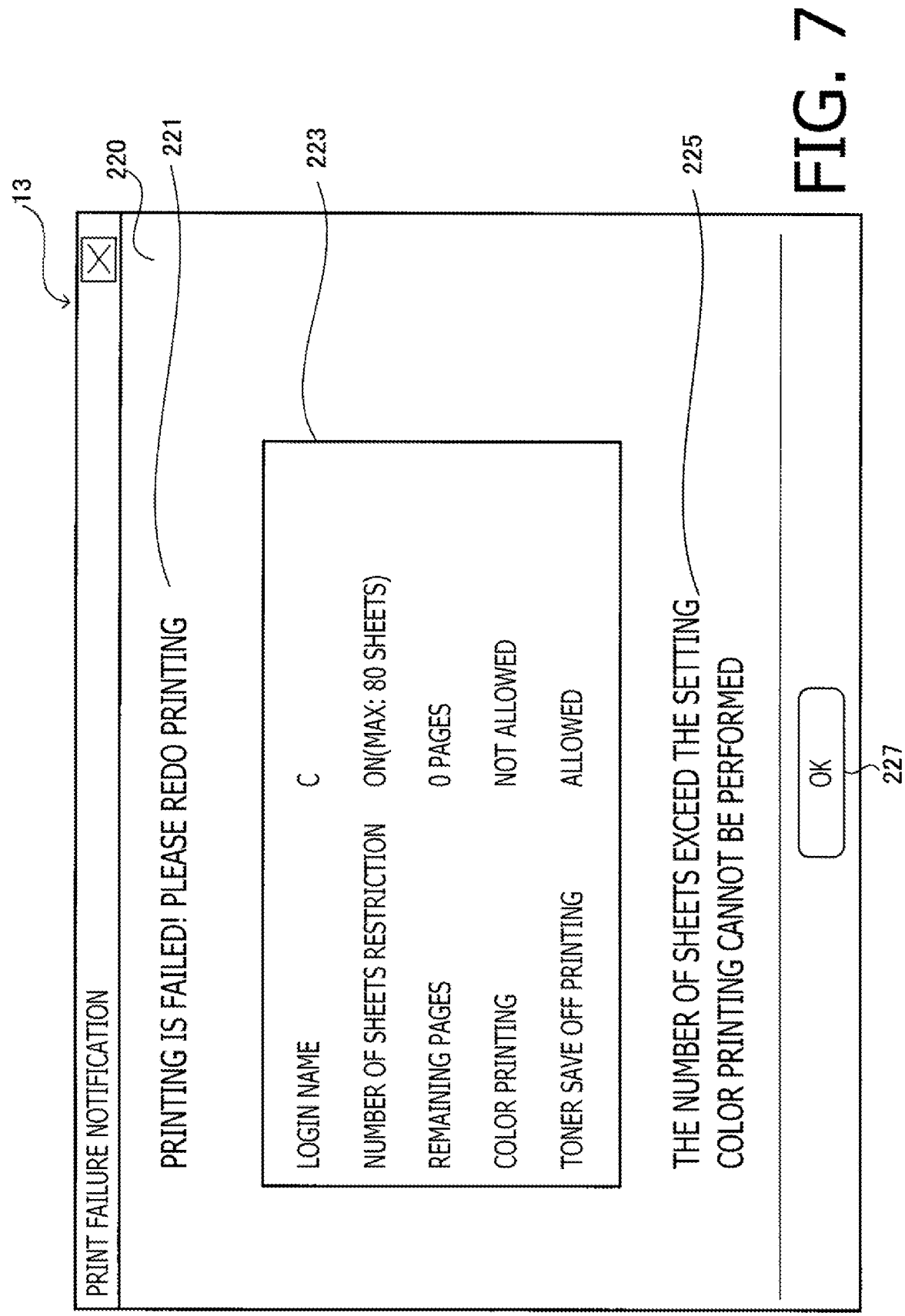
FIG. 7 is an example of a print failure notification screen.

The print failure notification screen 220 displayed on the user IF 13 includes, for example, as shown in FIG. 7, a first display field 223 that displays information based on the usage condition, and a second display field 225 that displays information about items that do not satisfy the usage condition. Further, the print failure notification screen 220 includes an OK button 227.

For example, when the print settings for printing set by the user C are configured such that the set number of printing pages to be printed exceeds the limit number of sheets to be printed set for user C and the "color" is set for the color/monochrome setting, the printer 2 determines that printing cannot be performed. In this case, the supporting program 42 obtains, from the printer 2, information indicating that printing has been canceled, the usage conditions for the user C, and the determination result. The supporting program 42 then displays the print failure notification screen 220 based on the above-described information on the user IF 13.

That is, the supporting program 42 may display, on the user IF 13, the processing result 221 indicating, for example, "Printing failed! Please redo the process" or the like, on the user IF 13.

Further, the supporting program 42 displays, in the first display field 223, the information based on the usage conditions of the user C received from the general-use printing program 41, and notifies the print settings of the user C restricted at the printer 2. For example, the supporting program 42 displays a letter "C" representing the user C in the login name field of the first display field 223 to notify that what is displayed is the usage condition of the user C. Then, the supporting program 42 displays "ON" and "Max. 80 sheets" in the field of the limit number of sheets, thereby notifying that the number of sheets that user C can print at one time is limited to 80. Further, the supporting program 42 displays "0 pages" in the field of remaining pages to be printed, thereby notifying that the number of sheets to be printed exceeds the limit and therefore none of the pages can be printed. It is noted that, when the number of sheets to be printed is limited to 80 and 50 pages are to be printed, the supporting program 42 displays "30 pages" in the field of remaining pages to be printed since printing of 30 more pages can be printed.

The supporting program 42 may, for example, display "not allowed" in the color printing field to notify that color printing is not available. Further, for example, the supporting program 42 may display "allowed" in the toner save OFF print field of the first display field 223 to notify that printing without toner save setting is available.

In addition, the supporting program 42 may display, in the second display field 225, the number of sheets printed and color/monochrome setting that do not meet the usage conditions. For example, in the second display field 225, messages such as "The number of sheets exceed the setting." or "Color printing cannot not be performed." that notify that the usage conditions are not satisfied.

Therefore, the user C can recognize the cause of printing failure from the display of the print failure notification screen 220 and use the same to make print settings for retrying printing.

When, for example, the user C operates the OK button 227 of the print failure notification screen 220 via the user IF 13, the supporting program 42 passes the notice that the printing is cancelled to the general-use printing program 41 and terminates the process, as shown in FIG. 3.

In contrast, when the supporting program 42 determines that the print job is to be transmitted without associating with the user ID in the transmission determination process of A05 (alt: transmit print job without associating with the user ID), the supporting program 42 generates the print data (A51). Since the process of A51 is the same as the process of A11, the explanation of the process of A51 is omitted. The supporting program 42 attaches a command to instruct the execution of printing and print settings to the print data, and transmits the same to the printer 2 (A52). In other words, the supporting program 42 does not transmit the user ID to the printer 2 as in the conventional technology when the function information 21 could not be obtained from the printer 2 (S3 in FIG. 4: NO) or when the function information 21 is obtained but the obtained function information 21 includes information to disable the restriction function (S5 in FIG. 4: NO). The printer 2, which receives the print data without the user ID attached, executes printing (A53). In this case, a possibility of a problem occurring in the printer 2 due to the transmission of unsupported user ID can be suppressed.

On the other hand, when the supporting program 42 determines, in the transmission determination process of A05 (alt: not transmit print job), that the print job is not to be transmitted, the supporting program 42 passes the information to cancel the print job to the general-use printing program 41 (A61). For example, the supporting program 42 does not transmit the print job to the printer 2 when the user ID could not be obtained or when the print job is canceled in the middle of the print settings.

As described in detail above, the supporting program 42 according to the first embodiment obtains a user ID via the OS 21 or via the user IF 13 when there is a print instruction to the general-use printing program 41, and associates the user ID with a print job. As the print job is transmitted from the PC 1 to the printer 2, the printer 2 can extract the usage condition using the user ID obtained by the supporting program 42, and determine whether or not to execute printing based on the extracted usage conditions. This enables the printer 2 to manage the availability of the print job even if the print job is transmitted via the general-use printing program 41.

Second Embodiment

Figure 8:
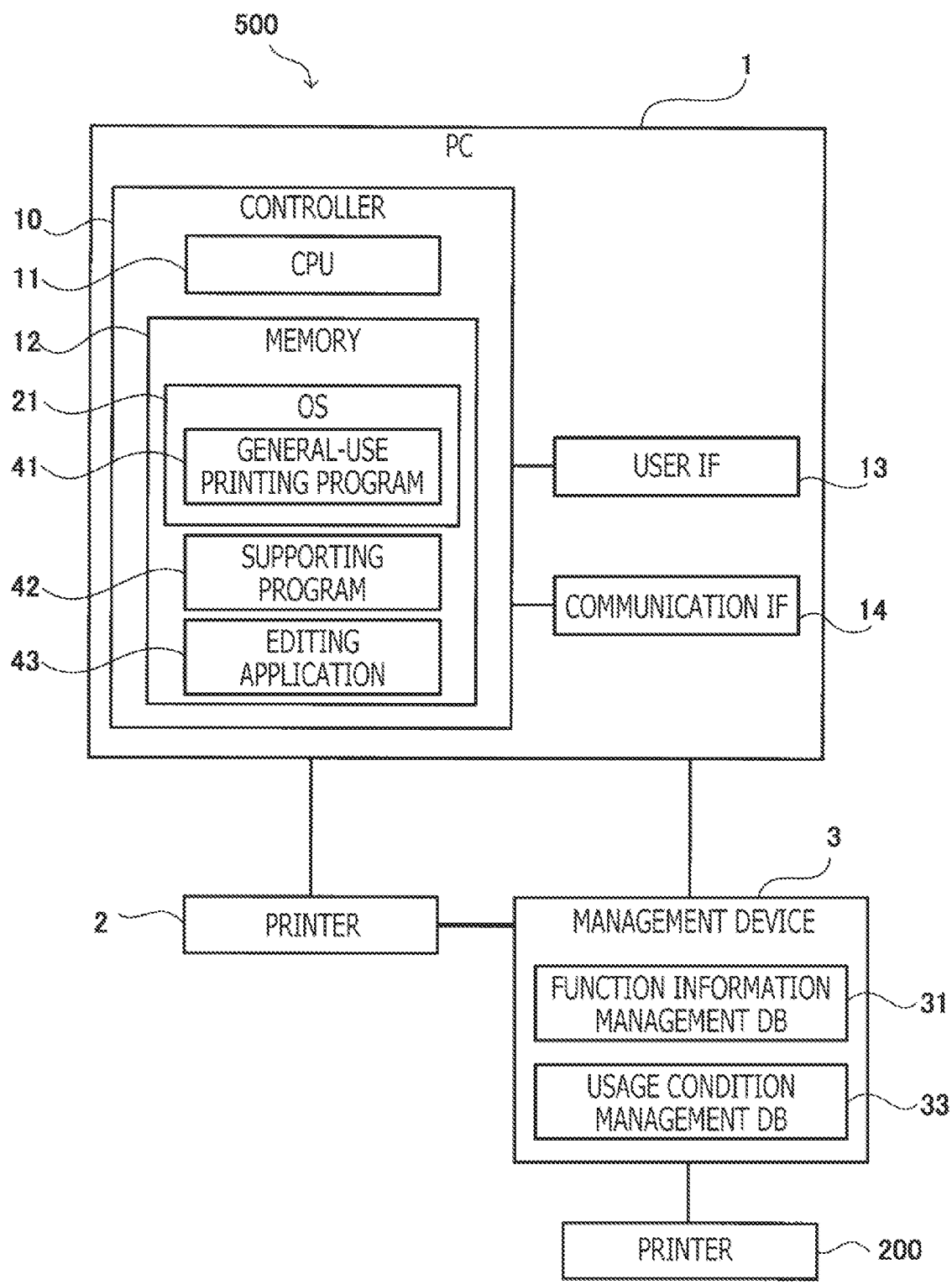
FIG. 8 is a block diagram of a printing system according to a second embodiment.

FIG. 8 shows a block diagram of a printing system 500 according to a second embodiment of the present disclosures. In the second embodiment, parts different from those of the first embodiment are described. Common parts are assigned with the same reference numerals as in the first embodiment, and explanations thereof are omitted as appropriate.

The printing system 500 has a PC 1, a printer 2, and a management device 3. The management device 3 is a device having a communication function and a data storage function. The management device 3 is, for example, communicatively connected to multiple printers, including the printer 2, which has the restriction function, and collectively manages the multiple printers. The management device 3 is, for example, a PC used by an administrator or a server on a network.

The management device 3 has a function information management DB 31 and a usage condition management DB 33. The function information management DB 31 stores identification information of the printers connected to the management device 3 with which information indicating enablement or disablement states of the restriction functions being associated, respectively. The usage condition management DB 33 is a database for managing the usage conditions set by the user for each printer connected to the management device 3. The usage condition management DB 33 stores the usage condition DB in association with the identification information of the printer. The usage condition DB is configured in the same way as the usage condition DB 23 shown in FIG. 1. The management device 3 performs a process similar to the determination process (A22 in FIG. 3) described in the first embodiment.

It is noted that the management device 3 stores, in association with the identification information of the printer 2, the function information and the usage condition DB in the function information management DB 31 and the usage condition management DB 33, respectively. Thus, according to the second embodiment, a memory load of the printer 2 can be reduced by not having the function information 21 and the usage condition DB 23.

In such a printing system, the supporting program 42 may be configured to obtain function information including information indicating the enablement or disablement of the restriction function from the management device 3. That is, when, for example, the printer 2 is selected in the print settings, the supporting program 42 transmits the identification information of printer 2 to the management device 3 via the communication IF 14 of the PC 1. When the management device 3 receives the identification information of the printer 2 from the PC 1, the management device 3 extracts the function information associated with the identification information of the printer 2 from the function information management DB 31 and transmits the same to the PC 1. The supporting program 42 receives the function information transmitted from the management device 3 via the communication IF 14 and stores the same in the memory 12. It is noted that the printing system may be configured such that the supporting program 42 obtains the function information including information indicating the enablement and disablement of the restriction function from the printer 2.

The supporting program 42 performs the processes of S3 through S27 in FIG. 4 using the obtained function information. These processes above have been described and are not repeated here.

When the printer 2 receives the print data to which the user ID and print settings are attached from the supporting program 42, the printer 2 requests the management device 3 to perform the determination process. That is, the printer 2 transmits the user ID and the print settings received from the supporting program 42 to the management device 3 together with the identification information of the printer 2. When the management device 3 receives the identification information of the printer 2, the management device 3 uses the identification information to identify the usage condition DB corresponding to the printer 2 in the usage condition management DB 33. Then, the management device 3 extracts, from the identified usage condition DB, the usage condition associated with the user ID received from the printer 2. Then, the management device 3 checks the extracted usage condition against the print settings received from the printer 2, and determines that printing on the printer 2 is executable when the print settings satisfy all the usage conditions, and determines that printing on the printer 2 is unexecutable when the print settings do not satisfy all the usage conditions. The management device 3 transmits the determination result back to the printer 2. The printer 2 executes printing when the determination result received from the management device 3 indicates that the printing is executable, while cancels the printing when the determination result indicates that the printing is unexecutable.

In this way, the management device 3 collectively manages the function information, including information indicating the enablement and disablement of the restriction functions, and the usage conditions set for users of the printers under its control, making it easier to use common usage conditions among the multiple printers.

Therefore, the supporting program 42 according to the second embodiment can make it possible to manage the enablement and disablement of the function of the printer 2 corresponding to the user, with respect to the print job transmitted from the PC 1 in which the OS-standard general-use printing program 41 is embedded by, as in the first embodiment, obtaining the function information 21 including the information indicating the enablement or disablement of the restriction function.

It is noted that the embodiments disclosed herein are merely examples and do not necessarily limit the invention in any way. Therefore, the technology disclosed herein can naturally be improved and/or transformed in various ways within aspects of the present disclosures. For example, the device connected to the PC 1 is not necessarily limited to a printer, but can be a multifunctional peripheral, a copier, a facsimile machine, or any other device having a printing function. Further, the number of printers connected to the PC 1 is not necessarily limited to the number shown in the embodiments but can be two or more.

For example, in the above embodiment, either one of the printer 2 and the management device 3 stores the function information 21 and the usage information, but the configuration may be modified such that one of the printer 2 and the management device 3 stores the function information 21 while the other of the printer 2 and the management device 3 stores the usage conditions. Alternatively, both the printer 2 and the management device 3 may store the function information 21 and the usage conditions in a synchronized manner.

It is noted that the processes of S7 through S13 in FIG. 4 may be omitted. As the supporting program 42 directly ask the user to input a user ID, the supporting program 42 identifies the user who has input a print instruction, thereby printing based on the usage conditions corresponding to the user can be performed. Alternatively, by omitting S9 and S11, and by receiving an approval from the user in advance, the user account obtained from the OS 21 can be used as a user ID without a process of obtaining approval each time.

For example, S1 to S5 in FIG. 4 may be omitted, and the supporting program 42 may always perform the processes from S7 onward when the supporting program 42 receives an execution instruction from the general-use printing program 41. It is noted, however, in the case where the function information 21 including the information indicating the enablement of the restriction function is not obtained, the user ID is not transmitted to the printer 2, thereby a possibility of a problem occurring due to a user ID that is unnecessary for the use of the printer 2 can be suppressed.

It is noted that S14 to S17 in FIG. 4 may be omitted so that the user ID may not be obtained by manual operation via the user IF 13. However, by directly requesting the user to input the user ID, the printer 2 that executes the print job associated with the user ID can execute printing based on the usage conditions corresponding to the user who has input the print instruction.

It is noted that S7 to S13 in FIG. 4 may be omitted, and the user ID may be obtained only by manual operation. However, by obtaining the user account of the login user from the OS 21 and using the same as the user ID, the user can save the time and effort of entering the user ID.

It is noted that A34 and A44 in FIG. 3 may be omitted so that the supporting program 42 does not notify the processing results of the printer 2 via the user IF 13. Alternatively, only A34 may be omitted so that notification processing is performed only when printing fails.

It is noted that the supporting program 42 may obtain function information for all printers connected to the PC 1, and when the supporting program 42 receives an execution instruction from the general-use printing program 41, the supporting program 42 may obtain the function information corresponding to the printer selected in the print settings.

It is noted that, in the embodiments, only the printing operation is described in detail as the operation of the supporting program 42, but the supporting program 42 may have other roles in addition. The program that executes the processing according to the present disclosures is not necessarily limited to the supporting program 42, but can be any program that is configured to receive instructions from the OS 21 or the general-use printing program 41 when printing is to be performed using the general-use printing program 41. It is further noted that the program may be a print workflow application for which Microsoft Corporation has released specifications.

The execution timing of the supporting program 42 is not necessarily limited to the example of the embodiment. For example, the supporting program 42 may accept execution instructions directly from the OS 21, or the program may be a resident supporting program 42. In the case where the program is a resident program, the supporting program 42 should perform the aforementioned operation upon receiving execution instructions.

In any flowchart disclosed in the embodiment, a plurality of processes in any plurality of steps can be executed in any order, or can be executed in parallel, to the extent that there is no inconsistency in the processing content.

The processes disclosed in the embodiments may be executed by a single CPU, multiple CPUs, hardware such as an ASIC, or a combination thereof. In addition, the processes disclosed in the embodiments may be realized in various forms, such as a non-transitory computer-readable recording medium in which a program for executing the processing is recorded as computer-executable instructions, or a method.

What is claimed is:

1. A non-transitory computer-readable recording medium for an information processing device having a computer, the information processing device being connectable to a printer having a restriction function of determining enablement or disablement of printing based on a usage condition set by a user, the computer-readable recording medium containing computer-executable instructions realizing a supporting program corresponding to the printer,
- wherein, when a print instruction making the printer to print an image is received from an application program implemented in the information processing device for a general-use printing program embedded in an operating system of the information processing device, the computer-executable instructions cause, when executed by the computer, the information processing device to perform:
  - obtaining identification information which identifies a user; and
  - transmitting a print job corresponding to the print instruction to the printer, the print job being associated with the identification information, and
- wherein the printer is configured to determine whether printing in accordance with the print job is to be performed based on the usage condition of the user identified by the identification information associated with the print job;
- wherein the instructions cause, when executed by the computer, the information processing device to further perform:
- obtaining management information indicating whether the restriction function of the printer is enabled or disabled; and
- when the print instruction is received:
  - in a case where the management information indicating that the restriction function is enabled has been obtained, obtaining the identification information and transmitting the print job corresponding to the print instruction to the printer; and
  - in a case where the management information indicating that the restriction function is enabled is not obtained, not obtaining the identification information or not transmitting the print job associated with the identification information, while transmitting the print job of the print instruction to the printer.

2. The non-transitory computer-readable recording medium according to claim 1,
- wherein the instructions cause, when executed by the computer, the information processing device to further perform, in the obtaining of the identification information:
- displaying a screen requiring input of the identification information using a user interface of the information processing device; and
- obtaining the identification information input through the user interface.

3. The non-transitory computer-readable recording medium according to claim 1,
- wherein the instructions cause, when executed by the computer, the information processing device to further perform, in the obtaining of the identification information:
- inquiring the operating system for a login user; and
- obtaining the identification information of the login user from the operating system.

4. The non-transitory computer-readable recording medium according to claim 1,
- wherein the instructions cause, when executed by the computer, the information processing device to further perform:

after the print job associated with the identification information is transmitted to the printer, obtaining a processing result based on the print job in the printer; and
when the processing result is obtained in the obtaining of the processing result, notifying the obtained processing result using a user interface of the information processing device.

5. A print system, comprising:
- a printer;
- a non-transitory computer-readable recording medium containing computer-executable instructions realizing a supporting program corresponding to the printer; and
- a computer of an information processing device, the computer being configured to execute the computer-executable instructions,
- the printer having a restriction function of determining enablement or disablement of printing based on usage condition set by a user,
- wherein, the instructions cause, when executed by the computer, the information processing device to perform, when a print instruction making the printer to print an image is received from an application program implemented in the information processing device for a general-use printing program embedded in an operating system of the information processing device:
  - obtaining identification information which identifies a user; and
  - transmitting a print job corresponding to the print instruction to the printer, the print job being with associated with the identification information, and
- wherein the printer is configured to determine whether printing in accordance with the print job is to be performed based on the usage condition of the user identified by the identification information associated with the print job;
- wherein the instructions cause, when executed by the computer, the information processing device to further perform:
- obtaining management information indicating whether the restriction function of the printer is enabled or disabled; and
- when the print instruction is received:
  - in a case where the management information indicating that the restriction function is enabled has been obtained, obtaining the identification information and transmitting the print job corresponding to the print instruction to the printer; and
  - in a case where the management information indicating that the restriction function is enabled is not obtained, not obtaining the identification information or not transmitting the print job associated with the identification information, while transmitting the print job of the print instruction to the printer.

6. The print system according to claim 5,
- wherein the instructions cause, when executed by the computer, the information processing device to further perform, in the obtaining of the identification information:
- displaying a screen requiring input of the identification information using a user interface of the information processing device; and
- obtaining the identification information input through the user interface.

7. The print system according to claim 5,
wherein the instructions cause, when executed by the computer, the information processing device to further perform, in the obtaining of the management information:
inquiring the operating system for a login user; and
obtaining the identification information of the login user from the operating system.

8. The print system according to claim 5,
wherein the instructions cause, when executed by the computer, the information processing device to further perform:
after the print job associated with the identification information is transmitted to the printer, obtaining a processing result based on the print job in the printer; and
when the processing result is obtained in the obtaining of the processing result, notifying the obtained processing result using a user interface of the information processing device.

\* \* \* \* \*